United States Patent
Wepfer

(10) Patent No.: US 11,773,819 B2
(45) Date of Patent: Oct. 3, 2023

(54) ROTOR BLADE FOR A WIND TURBINE

(71) Applicant: WEPFER TECHNICS AG, Andelfingen (CH)

(72) Inventor: Hans Wepfer, Berg-Dägerlen (CH)

(73) Assignee: WEPFER TECHNICS AG, Andelfingen (CH)

( * ) Notice: Subject to any disclaimer, the term of this patent is extended or adjusted under 35 U.S.C. 154(b) by 89 days.

(21) Appl. No.: 17/424,660

(22) PCT Filed: Jan. 20, 2020

(86) PCT No.: PCT/EP2020/051232
§ 371 (c)(1),
(2) Date: Jul. 21, 2021

(87) PCT Pub. No.: WO2020/152080
PCT Pub. Date: Jul. 30, 2020

(65) Prior Publication Data
US 2022/0082077 A1    Mar. 17, 2022

(30) Foreign Application Priority Data
Jan. 22, 2019 (EP) .................................... 19153139

(51) Int. Cl.
*F03D 1/06* (2006.01)
(52) U.S. Cl.
CPC ...... *F03D 1/0633* (2013.01); *F05B 2240/301* (2013.01); *F05B 2240/303* (2020.08);
(Continued)
(58) Field of Classification Search
CPC ............. F03D 1/0633; F05B 2240/301; F05B 2240/303; F05B 2240/304; F05B 2240/307; F05B 2250/71; Y02E 10/72
See application file for complete search history.

(56) References Cited

U.S. PATENT DOCUMENTS

| | | | | |
|---|---|---|---|---|
| 4,653,985 A | * | 3/1987 | Rotherham | ........... F03D 1/0633 416/235 |
| 9,039,380 B2 | * | 5/2015 | Koegler | ................ F03D 1/0675 416/228 |

(Continued)

FOREIGN PATENT DOCUMENTS

| CN | 203362391 U | * 12/2013 |
|---|---|---|
| CN | 106640478 A | *  5/2017 |

(Continued)

OTHER PUBLICATIONS

Russian Office Action for Russian Application No. 202192027, dated Mar. 30, 2022, with English translation.

*Primary Examiner* — J. Todd Newton
*Assistant Examiner* — Wayne A Lambert
(74) *Attorney, Agent, or Firm* — BIRCH, STEWART, KOLASCH & BIRCH, LLP

(57) ABSTRACT

The invention relates to a rotor blade (100) for a wind turbine, having a rotor blade root (102), a rotor blade outer edge (104), a leading edge (106) and a trailing edge (108), The leading edge (106) and the trailing edge (108) define a chord (110), the length of which increases from the rotor blade root (102) to the rotor blade outer edge (104), Chord centre points (112) define a rotor wing centre line (114) running from the rotor blade root (0.102) to the rotor blade outer edge (104) and the rotor wing centre line (114) divides the rotor blade outer edge (104) into a leading edge portion (116) and a trailing edge portion (118), a winglet (120) that extends only along the trailing edge portion (118) being arranged on the rotor blade outer edge (104).

20 Claims, 5 Drawing Sheets

(52) U.S. Cl.
CPC ... *F05B 2240/304* (2020.08); *F05B 2240/307* (2020.08); *F05B 2250/71* (2013.01)

(56) References Cited

U.S. PATENT DOCUMENTS

| | | | | |
|---|---|---|---|---|
| 9,366,224 | B2 * | 6/2016 | Braaten | F03D 1/0633 |
| 9,797,370 | B1 * | 10/2017 | McMahon | F03D 9/25 |
| 11,384,734 | B1 * | 7/2022 | Birkestrand | F03D 9/28 |
| 2006/0216153 | A1 * | 9/2006 | Wobben | F03D 1/0675 |
| | | | | 416/241 A |
| 2009/0257885 | A1 * | 10/2009 | Godsk | F03D 1/06 |
| | | | | 416/244 R |
| 2012/0134823 | A1 * | 5/2012 | Tully | F03D 1/0633 |
| | | | | 416/131 |
| 2012/0141249 | A1 * | 6/2012 | Carlson | F03D 9/28 |
| | | | | 415/202 |
| 2012/0217754 | A1 * | 8/2012 | Fukami | F03D 1/0633 |
| | | | | 290/55 |
| 2013/0052013 | A1 * | 2/2013 | Eckart | F03D 80/00 |
| | | | | 416/9 |
| 2013/0251535 | A1 * | 9/2013 | Koegler | F03D 1/0675 |
| | | | | 416/228 |
| 2015/0118051 | A1 * | 4/2015 | Steinke | F03D 1/0633 |
| | | | | 416/132 B |
| 2015/0300316 | A1 * | 10/2015 | Wepfer | F03D 1/0641 |
| | | | | 416/223 R |
| 2016/0131107 | A1 * | 5/2016 | Agtuca | F03D 17/00 |
| | | | | 416/147 |
| 2016/0258417 | A1 * | 9/2016 | Chiang | F02C 3/165 |
| 2017/0218777 | A1 * | 8/2017 | Church | F03D 1/0633 |
| 2017/0284366 | A1 | 10/2017 | Spitzner | |
| 2017/0306921 | A1 * | 10/2017 | Young | F03D 9/25 |
| 2017/0370345 | A1 * | 12/2017 | Keeley | F03B 17/061 |
| 2021/0246867 | A1 * | 8/2021 | Suzuki | F03B 3/121 |
| 2022/0299006 | A1 * | 9/2022 | Tsuda | F03D 1/0625 |

FOREIGN PATENT DOCUMENTS

| | | | | |
|---|---|---|---|---|
| DE | 10 2014 115 524 A1 | 4/2016 | | |
| EP | 2 998 572 B1 | 9/2016 | | |
| FR | 2475158 A1 * | 8/1981 | | |
| KR | 20090060039 A * | 6/2009 | | |
| KR | 20120133331 A * | 12/2012 | | |
| RU | 65 861 U1 | 8/2007 | | |
| WO | WO-2007147177 A2 * | 12/2007 | | F01D 5/141 |
| WO | WO 2015/067387 A1 | 5/2015 | | |
| WO | WO-2016019467 A1 * | 2/2016 | | B63H 1/28 |

* cited by examiner

ROTOR BLADE FOR A WIND TURBINE

TECHNICAL FIELD

The invention relates to a rotor blade for a wind turbine, with a rotor blade root, a rotor blade tip, a leading edge and a trailing edge. The leading edge and the trailing edge define a profile chord. Furthermore, said invention relates to a rotor rim with a rotor blade, and to a wind turbine with a rotor blade.

PRIOR ART

Rotor blades, rotor rims and wind turbines are well known in the prior art.

Thus, for example, EP 2 998 572 B1 describes a wind power plant rotor blade having an upper side, a lower side, a front edge, a rear edge, a hub fastening means and a blade tip, the wind power plant rotor blade being divided into a hub region, a middle region and a blade tip region, and a root region being defined from the hub fastening means as far as the maximum blade depth. A radially outwardly running air guiding duct for guiding extracted air from an extraction region to an ejection region which is arranged in the blade tip region is provided within the wind power plant rotor blade. A boundary layer suction operation takes place, the extraction of the air taking place on the upper side of the wind power plant rotor blade, and a boundary-layer fence being provided in the hub region close to the hub fastening means in order to prevent a flow in the direction of the hub fastening means.

In the case of rotor blades of wind power plants, an undesired pressure equalization between the pressure side and the suction side of the rotor blade can occur in the region of the blade tip, in the case of which pressure equalization the air flows around the blade tip. This effect leads to a reduced lift in the blade tip region and to pronounced vortices which increase the flow resistance. In the case of rotor blades of this type, small blade attack angles and profiles with little or even no lift and a reduced chord length are usually used in the blade tip region. As a result, the vortices can be reduced, suboptimal lift remaining in the region of the blade tip, however.

Document DE 10 2014 115 524 A1 describes a wind power plant rotor blade with sections which adjoin one another in the following sequence from the blade root toward the blade tip. The rotor blade comprises a blade connector section for connection to a rotor hub, a rotor blade main part which has an aerodynamic profile, a suction side and a pressure side, a transition section which has a curvature toward the suction side or toward the pressure side, and a winglet which has a multiplicity of profiles with in each case one profile chord and one profile chord center point. Furthermore, the wind power plant rotor blade comprises a winglet surface, in which the profile chords are arranged, a center line which connects the profile chord center points to one another, a profile end edge, a profile nose edge, a height, a base section which adjoins the transition section, a tip section which adjoins the blade tip, and a center section which connects the base section and the tip section to one another. A sweep angle between a reference line which is arranged in the winglet surface and orthogonally with respect to a profile chord of a profile of the winglet, which profile adjoins the transition section, and the center line is greater in the tip section than when arranged in the base section, the sweep angle being measured from the reference line in the direction toward the profile end edge of the winglet. The profile end edge of the winglet is concavely curved in at least one section.

In the case of the known rotor blades of wind power plants, the surround-flow at the blade tip cannot be avoided completely despite the use of winglets. In use, known rotor blades still have great vortices, which has a negative influence on the degree of efficiency of the rotor blade and therefore of the wind power plant. In addition, the wind turbine plants which are known in the prior art generate a great amount of noise.

SUMMARY OF THE INVENTION

It is an object of the invention to provide a rotor blade for a wind turbine system, which rotor blade belongs to the technical field mentioned at the outset and, during operation, makes a higher degree of efficiency and a reduced amount of noise possible.

The manner in which the object is achieved is defined by way of the features of claim 1. The invention comprises a rotor blade for a wind turbine with a rotor blade root, a rotor blade outer edge, a leading edge and a trailing edge, the leading edge and the trailing edge defining a profile chord, the length of which is configured so as to increase from the rotor blade root to the rotor blade outer edge. The rotor blade comprises profile chord center points which define a rotor wing center line in a manner which runs from the rotor blade root to the rotor blade outer edge, and the rotor wing center line divides the rotor blade outer edge into a leading edge section and a trailing edge section. Furthermore, a winglet which extends merely along the trailing edge section is arranged on the rotor blade outer edge.

In the context of the invention, a rotor blade is to be understood to mean a rotor blade which is suitable, in particular, for use in a wind power plant. Therefore, the purpose has to be met that the rotor blade or the entire rotor rim can be set in motion by incident wind. In contrast to this, a rotor blade in the context of the invention is to be distinguished from rotor blades of the type which are set in motion by incident water, for example. This is the case by way of example in hydroelectric power plants. Known rotor blades which are used to bring about a fluid flow in the driven state are likewise to be distinguished from a rotor blade in the context of the invention. This is the case, for example, in marine propulsion propellers or fans.

As a result, for example, the technical advantage is achieved that improved vortex shedding can be achieved on the training edge and, in particular, in that region of the trailing edge which adjoins the trailing edge section. As a result, a significantly increased degree of efficiency of the overall wind turbine plant can be achieved. In addition, a considerable noise reduction can be brought about which allows the use of the rotor blade according to the invention to become considerably more versatile. For example, it is therefore possible for a wind turbine with a rotor blade according to the invention to be used in the immediate vicinity of residential areas.

In accordance with one preferred embodiment, a spacing A between the trailing edge section and a base of the winglet increases from the rotor wing center line in the direction of the trailing edge. As a result, for example, the technical advantage is achieved that the height of the winglet increases continuously in the direction of the trailing edge. The continuous increase in turn makes an additional improvement of the vortex shedding behavior possible, since detaching of the laminar flow on the rotor blade can be prevented for a longer time. As a result, the degree of efficiency and the noise reduction are improved additionally.

In order to bring about optimum surround-flow of the winglet and to reduce undesired boundary layer detachments and turbulences during operation of the rotor blade, the base of the winglet is of circular configuration in the rotor blade plane. As a result, more torque can be generated, in particular, at lower wind speeds, since the fluid experiences more resistance as a result of the deflection. Overall, the degree of efficiency is therefore increased further.

In accordance with a further preferred embodiment, the circular base of the winglet is part of a rotation circle of the rotor blade. As a result, for example, the technical advantage is achieved that the height of the winglet increases disproportionately in the direction of the trailing edge. The disproportionate increase of the winglet height in turn makes an additional improvement of the vortex shedding behavior possible, as a result of which the degree of efficiency and the noise reduction can be improved additionally. By way of a suitable supplemental inclination of the rotor blade, the effect of the disproportionate height increase of the winglet can be facilitated. On account of the increase of the profile chord length from the rotor blade root to the rotor blade outer edge, a particularly great area proportion of the rotor blade is available in the region of the trailing edge section as a winglet as a result of the supplemental inclination of the rotor blade.

In particular in the outer region of the rotor blade, it is advantageous in comparison with the inner region of the rotor blade on account of the higher speeds if a profile thickness decreases from the rotor blade root to the rotor blade outer edge. As a result, the suction force at the outer end is attenuated, as a result of which the formation of pressure differences can be reduced.

In order to realize a particularly low-fiction transition from the rotor blade root to the rotor blade thickness, a ratio of the profile thickness to the length of the profile chord is of almost constant configuration along the wing longitudinal axis.

On account of the different speeds, as occur during operation on the rotor blade between the rotor blade root and the rotor blade outer edge, the different sections of the rotor blade are given different tasks and/or effects. For example, that region of the rotor wing which is arranged in the region of the rotor blade root is assigned the task of running up or starting. In other words, it is important for said region to make lift possible even at low air or wind speeds, and therefore to bring about running up of the rotor blade. In order to bring about running up, the rotor blade has an angle of incidence of at least 30° on the rotor blade root. The running-up angle can also be of greater or smaller configuration, however, in a manner which is dependent on the desired effect.

As has already been stated, the different sections of the rotor blade are given different tasks and/or effects on account of the different motion speeds, as occur during operation on the rotor blade between the rotor blade root and the rotor blade outer edge. For example, what is known as the resistance wing section is assigned in the region of the rotor blade outer edge. In other words, it is important for said region to generate as much resistance as possible, in order to enable as high a rotational speed as possible and as high a torque as possible even at low air or wind speeds. In order to achieve as great a resistance as possible and in order to keep the rotor blade in motion, the rotor blade has an angle of incidence of at most 5° on the rotor blade outer edge.

In accordance with one particularly preferred embodiment, an angle of incidence on the rotor blade outer edge is greater than zero at the leading edge and is less than or equal to zero at the trailing edge. This transition of the angle of attack from the leading edge as far as the trailing edge is achieved by way of a curvature of the profile chord in the region of the rotor blade outer edge. Here, the extent of the curvature is linked to the desired resistance and the intended circumferential speed of the rotor blade. As a result, for example, the technical effect is achieved that the trailing edge of the rotor blade leaves a virtually laminar flow state behind in the fluid. As a result, the following rotor blade scarcely has to fight with vortices in the fluid, as a result of which an optimum degree of efficiency can be achieved in the case of each of the following rotor wings.

As has already been stated, the angle of incidence can be different depending on the section of the rotor blade. In order to reduce undesired boundary layer detachments and turbulences during operation of the rotor blade, the rotor blade has a twist which is of continuous configuration from the rotor blade root as far as the rotor blade outer edge.

In accordance with one particularly preferred embodiment, both the leading edge and the trailing edge are of sickle-shaped configuration. In particular, the sickle-shaped configuration in conjunction with a curvature of the rotor blade is advantageous. A high angle of incidence in the region of the rotor blade root is achieved by way of the curvature and the sickle shape. This is particularly expedient for the self-contained starting function of the rotor blade. On account of the desired resistance wing function in the outer region of the rotor blade, the angle of incidence is reduced in a manner which runs toward the outside, which is additionally supported by way of the sickle shape.

In order to increase the stability of the rotor blade during operation and in order to reduce the flutter tendency, the rotor wing center line has a supplemental inclination in the rotational direction in relation to a wing longitudinal axis. The geometric action point of the rotor blade is shifted to outside the rotor blade body in this way, as a result of which possible flutter can be reduced greatly. The suppression of flutter is therefore assisted by way of a torque which holds the rotor blade in continual tension. In other words, the rotor blade therefore has the tendency in the direction of feathering pitch.

In accordance with one particularly preferred embodiment, the supplemental inclination of the rotor wing center line comprises a supplemental inclination angle $\beta$ of between 1° and 10°. In accordance with a further embodiment, the supplemental inclination of the rotor wing center line comprises a supplemental inclination angle of between 2° and 6°. In accordance with yet a further embodiment, the supplemental inclination of the rotor wing center line comprises a supplemental inclination angle of between 3° and 4°.

In accordance with an additional embodiment, the rotor blade has a curvature which is configured in the wing longitudinal axis. In particular, the curved configuration in conjunction with a sickle-shaped configuration of the rotor blade is advantageous. A high angle of incidence in the region of the rotor blade root is achieved by way of the curvature and the sickle shape. This is helpful, for example, for the self-contained starting function of the rotor blade. On account of the desired resistance wing function in the outer region of the rotor blade, the angle of incidence is reduced in a manner which runs to the outside, which is supported additionally by way of the sickle shape.

With regard to a further aspect of the present invention, the manner in which the object is achieved is defined by a rotor rim for a wind turbine as claimed in claim 15. Accordingly, the rotor rim comprises a plurality of rotor blades in accordance with one of the preceding embodiments.

The advantages of the rotor rim according to the invention correspond, in a similar form, to the advantages of the rotor blade according to the invention, as a result of which, for example, improved vortex shedding at the trailing edge can be achieved, in particular in that region of the trailing edge of each rotor blade which adjoins the trailing edge section. As a result, a significantly increased degree of efficiency of the entire wind turbine system can be achieved.

In addition, considerable noise reduction can be brought about, which allows the use of the rotor rim according to the invention to become considerably more versatile. For example, it is therefore possible for a wind turbine with a rotor blade according to the invention to be used in the immediate vicinity of residential areas.

In accordance with one particular embodiment, the rotor rim comprises at least 2 and at most 8 rotor blades. In accordance with a further embodiment, the rotor rim comprises 6 rotor blades. In accordance with comprehensive scientific experiments and wind tunnel tests, the rotor rim according to the invention with precisely 6 rotor blades has a maximum degree of efficiency. This is substantiated by the fact that a spacing between the trailing edge of one rotor blade and the leading edge of the following rotor blade is configured in such a way that the fluid can become steady as far as possible between the rotor blades in the operating state of the wind turbine. This permits optimum flow preconditions for the following rotor blade and increases the degree of efficiency. There is a close causal relationship here with the tip speed ratio of the entire rotor rim.

In accordance with an additional embodiment, the rotor rim has a tip speed ratio of at most 7. In accordance with a further embodiment, the rotor rim has a tip speed ratio of at most 4. In accordance with yet a further embodiment, the rotor rim has a tip speed ratio of 1.5.

The tip speed ratio is defined as the ratio of the circumferential speed to the wind speed. Known wind turbines in the prior art have tip speed ratios of from 5 to 8, and are called what are known as fast running turbines. The rotor rim according to the invention is to be called what is known as a slow running turbine, since a tip speed ratio of 1.5 can also be achieved.

In accordance with a further aspect of the present invention, the manner in which the object is achieved is by way of a wind turbine with a rotor blade or a rotor rim in accordance with one of the preceding embodiments.

The advantages of the wind turbine according to the invention correspond, in a similar form, to the advantages of the rotor blade according to the invention or of the rotor rim according to the invention. Improved vortex shedding at the trailing edge of each rotor blade is also achieved by way of the wind turbine according to the invention. As a result, a considerably increased degree of efficiency of the wind turbine plant is achieved. In addition, considerable noise reduction can be brought about, which allows the use of the wind turbine according to the invention to become more versatile. The wind turbine according to the invention can be used, for example, in the immediate vicinity of residential areas.

Further advantageous embodiments and combinations of features of the invention result from the following detailed description and the entirety of the patent claims.

BRIEF DESCRIPTION OF THE DRAWINGS

In the drawings which are used to explain the exemplary embodiment.

In principle, identical parts are provided with identical designations in the figures.

WAYS OF IMPLEMENTING THE INVENTION

Figure 1:
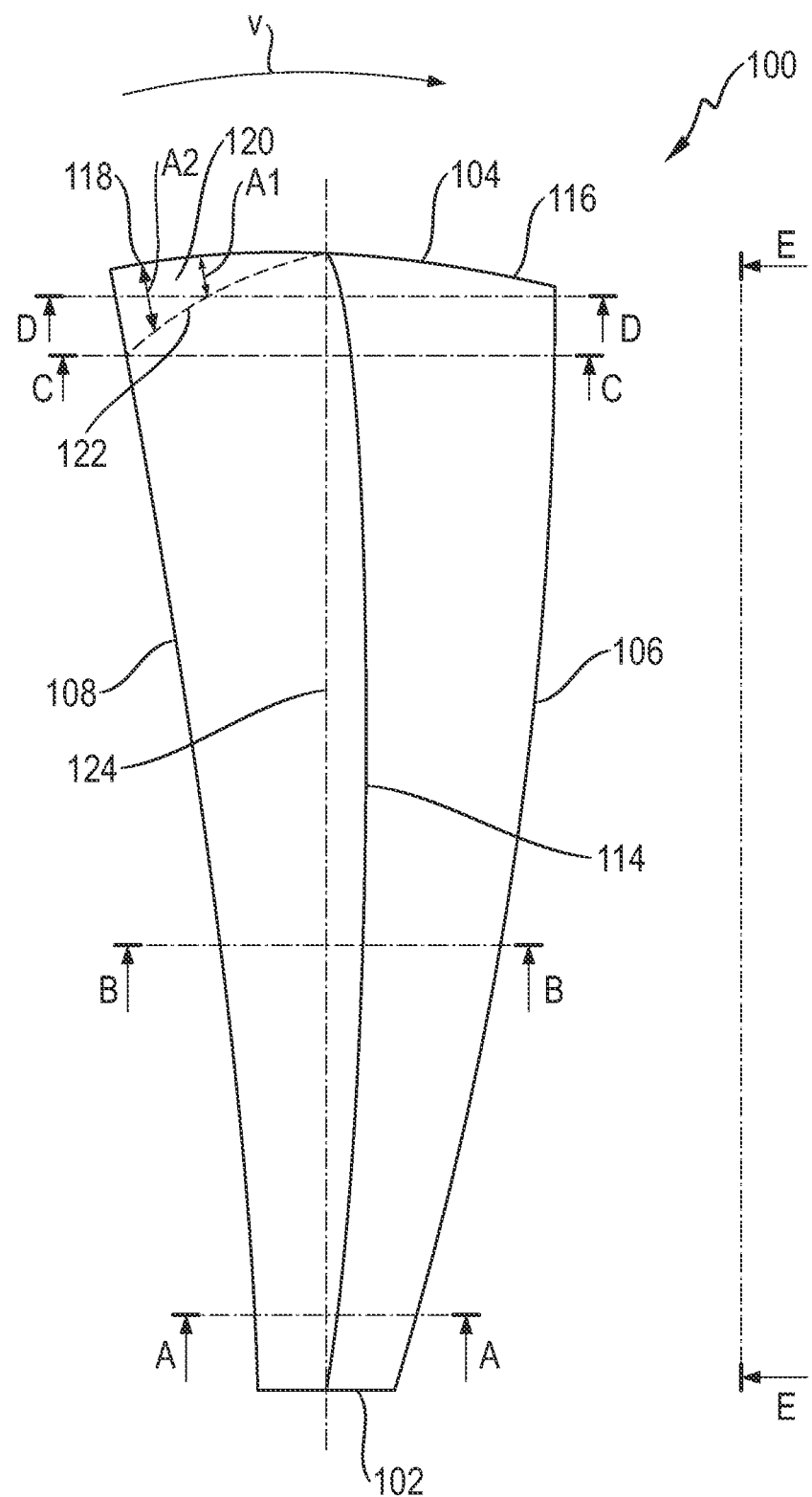
FIG. 1 shows one embodiment of a rotor blade according to the invention.

FIG. 1 shows one embodiment of a rotor blade 100 according to the invention. The rotor blade 100 is suitable for a rotor rim 200 (not shown) to be configured with a plurality of rotor blades 100. A lower section of the rotor blade 100 comprises a rotor blade root 102 which adjoins a hub of a wind turbine during operation of the rotor blade 100. The rotor blade outer edge 104 of the rotor blade 100 is situated at an outer end of the rotor blade 100, which outer end lies opposite the rotor blade root 102. The rotational direction v of the rotor rim 200 in use is indicated by way of an arrow above the rotor blade outer edge 104. In addition, the rotor blade 100 has a leading edge 106 and a trailing edge 108. Both the leading edge 106 and the trailing edge 108 are in each case of sickle-shaped configuration, the respective bulge of the two sickle-shaped curvatures being configured toward the front in the rotational direction v of the rotor blade 100. In other words, the sickle curvature of the rotor blade 100 is configured counter to the rotational direction v. A rectilinear connection defines in each case a profile chord 110 (not shown) from the leading edge 106 to the trailing edge 108. This is explained in greater detail in the description of FIGS. 3A to 3D. The length of the profile chord 110 increases continuously starting from the rotor blade root 102 as far as the rotor blade outer edge 104. The geometric center of each profile chord defines a profile chord center point 112 (not shown). The continuous course or the continuous juxtaposition of all the profile chord center points 112 from the rotor blade root 102 as far as the rotor blade outer edge 104 define a rotor wing center line 114. The rotor wing center line 114 is of sickle-shaped configuration like the leading edge 106 and the trailing edge 108.

At the upper end of the rotor blade 100, the rotor wing center line 114 divides the rotor blade outer edge 104 into a leading edge section 116 and a trailing edge section 118. The leading edge section 116 defines a front half (in the rotational direction v) of the rotor blade outer edge 104 which directly adjoins the leading edge 106. In a corresponding manner, the trailing edge section 118 defines a rear half (in the rotational direction v) of the rotor blade outer edge 114 which immediately adjoins the trailing edge 108. A winglet 120 is situated in the region of the trailing edge section 118.

The extent of the winglet 120 is preferably restricted to the region of the trailing edge section 118, but the winglet can also extend beyond this. For example, the winglet 120 can extend over the entire trailing edge section 118 as far as into the leading edge section 116. A height of the winglet 120 increases continuously in the direction of the trailing edge 108. Here, height is understood to mean the spacing of the winglet outer edge from the rotor blade body. Therefore, the winglet outer edge directly on the trailing edge 108 is higher (see A2) than at a point of the winglet outer edge which lies further inside (see A1). Therefore, the height of the winglet 120 in the rotational direction v at the rear end of the rotor blade outer edge 104 is greatest in a section which adjoins the trailing edge 108. The winglet 120 configures a line which lies in the plane of the rotor blade body and along which the transition of the rotor blade 100 into the winglet 120 is shown. In other words, the line characterizes a kink in the rotor blade body which represents the base 122 of the winglet 120. The base 122 of the winglet 120 configures a variable spacing A with respect to the rotor blade outer edge 104 or the trailing edge section 118. The spacing A between the trailing edge section 118 and the base 122 of the winglet 120 increases continuously from the rotor wing center line 114 in the direction of the trailing edge 108. A spacing A1 is therefore of smaller configuration than the spacing A2. It can be seen diagrammatically that the base 122 of the winglet 120 is of circular configuration in the rotor blade plane. The circular configuration is described in greater detail, in particular, in FIGS. 2 and 5. As a result of the configuration of the winglet 120 in the region of the trailing edge section 118, the trailing edge section 118 is bent toward the winglet outer edge and is bent upward from the rotor blade body.

Figure 2:
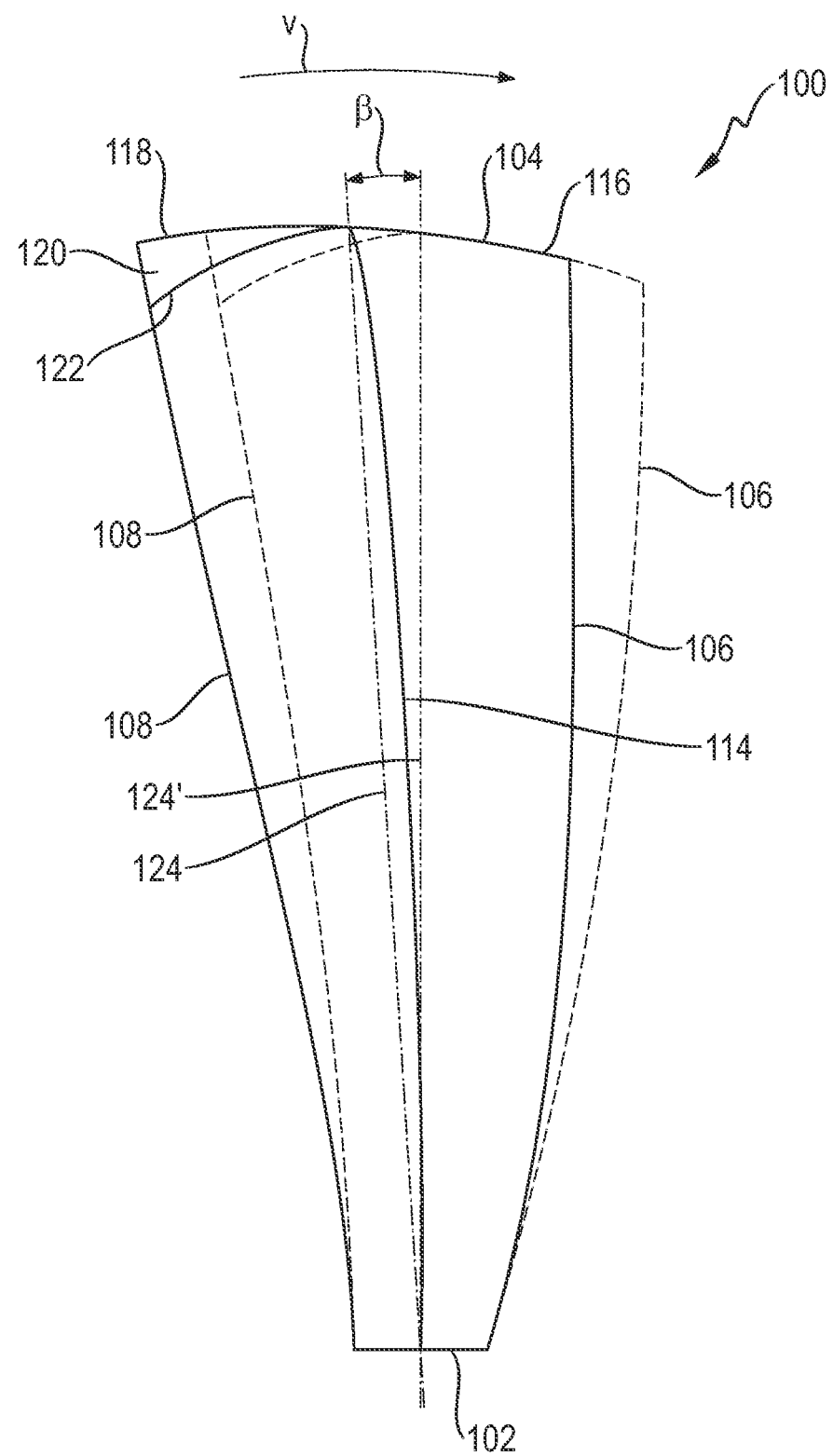
FIG. 2 shows a further embodiment of a rotor blade according to the invention with a supplemental inclination angle.

FIG. 2 shows a further embodiment of a rotor blade 100 according to the invention with a supplemental inclination angle β. The supplemental inclination angle β results from an obliquity of the wing longitudinal axis 124, 124' with respect to the rotational direction v of the rotor blade 100. The supplemental inclination increases the stability of the rotor blade 100 during operation and additionally reduces the flutter tendency. As has already been stated, the geometric action point of the rotor blade 100 is moved here, as a result of which a torque is brought about which holds the rotor blade 100 in continual tension. According to FIG. 2, the optimum supplemental inclination angle β is approximately from 3° to 4°. This embodiment also diagrammatically shows the circular configuration of the base 122 of the winglet 120, which base 122 is configured so as to lie in the rotor blade plane. The circular configuration will be explained in greater detail in the description of FIG. 5. In addition, the advantages of the interaction between the supplemental inclination angle β and the circular base 122 of the winglet 120 are to be described in detail at said point. By the rotor blade 100 or the wing longitudinal axis 124, 124' having a supplemental inclination angle β and by the base 122 being of circular configuration, the circular base 122 of the winglet 120 can be part of a rotational circle 202 of the rotor blade 100 in an optimum configuration. In other words, the radius and center point of the circular base 122 and the radius and the center point of a rotational circle of the rotor blade 100 are identical. A renewed description of identical features of the preceding figure is dispensed with at this point.

Figure 3A:
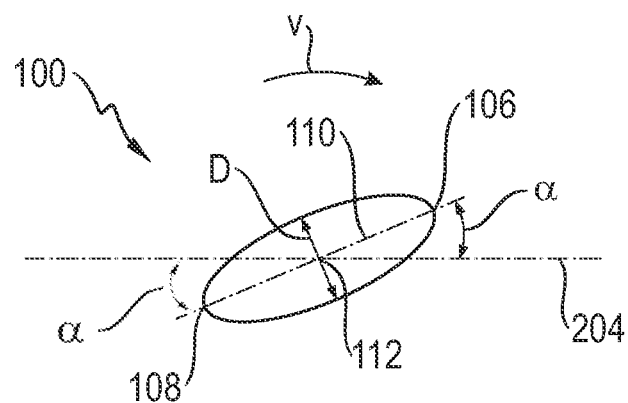
FIG. 3A shows a cross-sectional view of a rotor blade according to the invention in the section A-A of FIG. 1.

FIG. 3A shows a cross-sectional view of a rotor blade 100 according to the invention in the section A-A of FIG. 1. The section A-A is situated adjacently to or at least in the region of the rotor blade root 102. The profile chord 110 has the smallest length in the region of the rotor blade root 102, since the length of the profile chord 110 increases continuously in the direction of the rotor blade outer edge 104. A sectional view of a rotational plane 204 shows that plane in which the rotor blade 100 and the entire rotor rim 200 (not shown) move during operation of the wind turbine (not shown). The profile chord 110 encloses an angle of incidence α with the rotational plane 204. Said angle of incidence α is approximately 30° at the rotor blade root 102. As has already been stated, the different sections of the rotor blade 100 are given different tasks or effects. The region of the rotor blade root 102 makes self-contained running up or starting of the rotor rim 200 possible. In other words, it is important for lift to be made possible even in the case of lower air or wind speeds and therefore for running up of the rotor blade 100 to be brought about. This is made possible by way of a defined angle of incidence α which is approximately 30° in said present embodiment. The angle of incidence α generates a pressure difference which assists the running up function. A further parameter which influences the pressure difference is the profile thickness D which illustrates the dimension of the rotor blade thickness arranged orthogonally with respect to the profile chord 110. The rotational direction v is to be understood to mean the movement direction of the rotor blade 100 in FIG. 3A, the leading edge 106 and the trailing edge 108 once again clarifying the movement direction of the rotor blade 100. The point of intersection of the profile chord 110 and the rotational plane 204 corresponds to the profile chord center point 112.

Figure 3B:
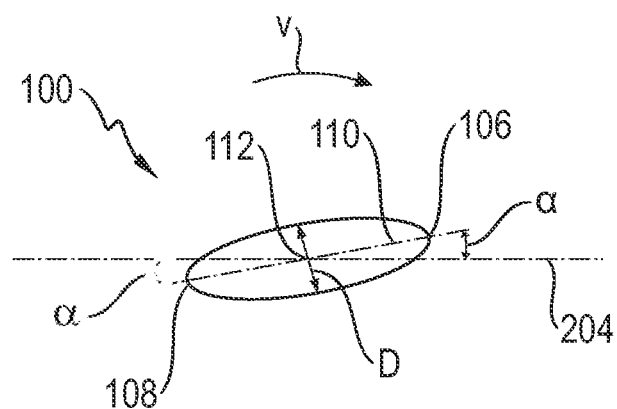
FIG. 3B shows a cross-sectional view of a rotor blade according to the invention in the section B-B of FIG. 1.

FIG. 3B shows a cross-sectional view of a rotor blade 100 according to the invention in the section B-B of FIG. 1. The section B-B as situated in a middle section of the rotor blade 100 between the rotor blade root 102 and the rotor blade outer edge 104. The profile chord 110 is somewhat longer in said region than in the region of the rotor blade root 102. The rotational plane 204 once again shows the movement plane of the rotor blade 100 and the entire rotor rim 200 (not shown) during operation, and the profile chord 110 encloses an angle of incidence α with the rotational plane 204. The angle of incidence α is somewhat smaller than in the region of the rotor blade root 102, and lies between 0° and 30°. The point of intersection of the profile chord 110 and the rotational plane 204 once again corresponds to the profile chord center point 112. The profile thickness D is of somewhat shorter dimensions than the profile thickness D in the section A-A of FIG. 3A. A renewed description of identical features of the preceding figure is dispensed with at this point.

Figure 3C:
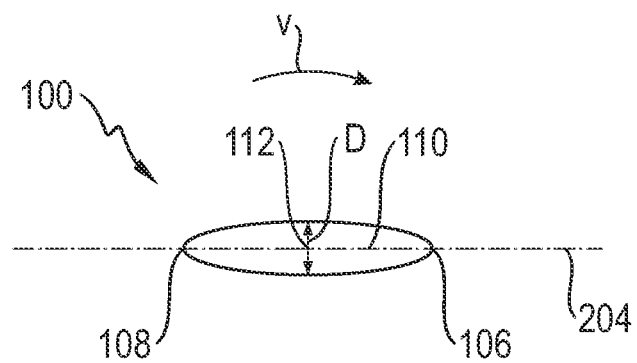
FIG. 3C shows a cross-sectional view of a rotor blade according to the invention in the section C-C of FIG. 1.

FIG. 3C shows a cross-sectional view of a rotor blade 100 according to the invention in the section C-C of FIG. 1. The section C-C is situated in a section of the rotor blade 100 situated adjacently to or at least in the vicinity of the rotor blade outer edge 104. The profile chord 110 is somewhat longer in this region than in the region of the middle section B-B and considerably longer than in the section A-A in the region of the rotor blade root 102. The profile chord 110 itself is configured virtually parallel to the rotational plane 204. The angle of incidence α lies approximately at 0°. The profile thickness D is once again of somewhat shorter dimensions than the profile thickness D in the section A-A of FIG. 3A and than the profile thickness D in the section B-B of FIG. 3B. A renewed description of identical features of the preceding figures is dispensed with at this point.

Figure 3D:
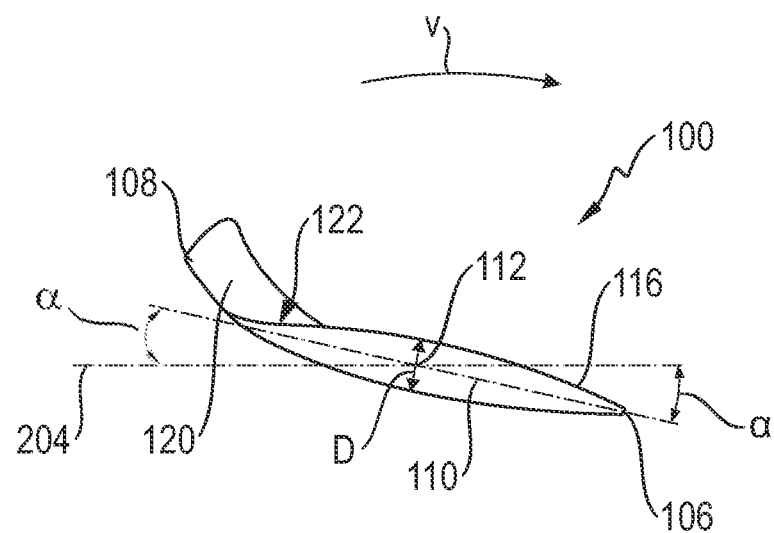
FIG. 3D shows a cross-sectional view of a rotor blade according to the invention in the section D-D of FIG. 1.

FIG. 3D shows a cross-sectional view of a rotor blade 100 according to the invention in the section D-D of FIG. 1. The section D-D is situated in a section of the rotor blade 100 situated immediately adjacently on the rotor blade outer edge 104. The profile chord 110 is likewise configured to be longer in said region than in the region of the middle section B-B and longer than in the section A-A of the region of the rotor blade root 102. The profile chord 110 and the rotational plane 204 together enclose an angle of incidence α which has a negative sign in comparison with the preceding FIGS. 3A and 3B. Here, the angle of incidence α is approximately −10°, since the angle of incidence α extends below the rotational plane 204. The profile thickness D is once again of somewhat shorter configuration than the profile thickness D in the section B-B of FIG. 3B. An upwardly deformed section which represents a part of the winglet 120 in the section D-D is situated in the region of the trailing edge 108. A renewed description of identical features of the preceding figures is dispensed with at this point.

Figure 4:
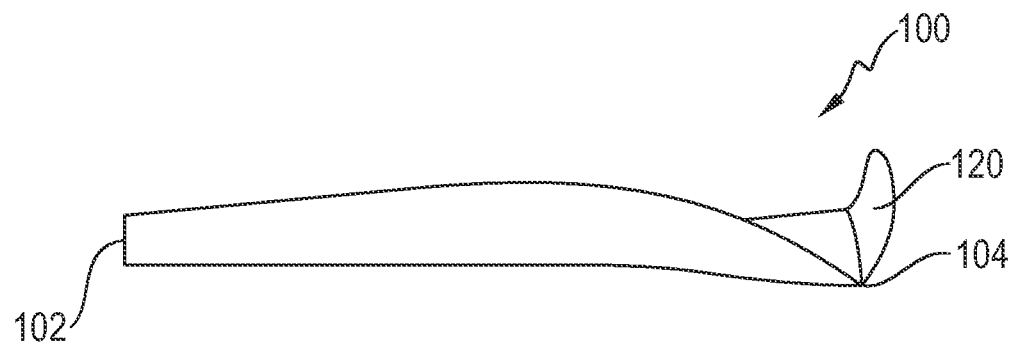
FIG. 4 shows a side view of a rotor blade according to the invention from the view E-E of FIG. 1.

FIG. 4 shows a side view of a rotor blade 100 according to the invention from the view E-E of FIG. 1. In the side view, the rotor blade 100 exhibits a bulge which is configured in the wing longitudinal axis 124 (not shown). The bulge is therefore configured between the rotor blade root 102 and the rotor blade outer edge 104, and is superimposed by way of a twist which results from the different angles of incidence α according to the sectional views A-A to D-D of FIGS. 3A to 3D. The winglet 120 is arranged on the rotor blade outer edge 104, which winglet 120 is situated merely in the region of the trailing edge section 118 (not shown) and is therefore only partially visible in the side view.

Figure 5:
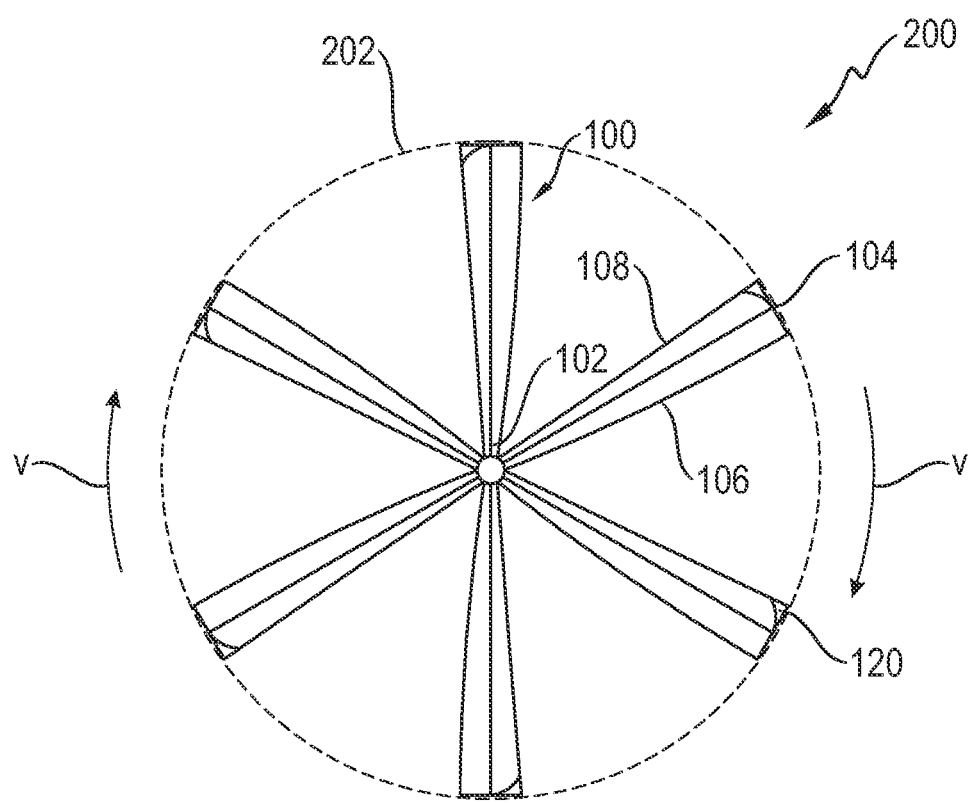
FIG. 5 shows a diagrammatic view of a rotor rim according to the invention.

FIG. 5 shows a diagrammatic view of a rotor rim 200 according to the invention. The rotor rim 200 comprises a total of six rotor blades 100. The rotational direction v is indicated diagrammatically by way of direction arrows, and the rotation circle 202 is indicated diagrammatically on the circumference of the rotor rim 200. The rotor rim 200 comprises precisely six rotor blades 100 because the degree of efficiency is particularly high as a result. This is substantiated by way of the optimum spacing of two rotor blades 100 which follow one another. A fluid can therefore become sufficiently steady after leaving a trailing edge 108 of a rotor blade 100, as a result of which conditions which are as optimum as possible result for the leading edge of the following rotor blade 100. This makes optimum flow preconditions possible, and therefore increases the degree of efficiency of the wind turbine.

In summary, it is to be noted that the embodiments of the rotor blade according to the invention can be combined with one another. None of the disclosed features rules out the combination with another feature, and individual combinations of features interact with one another and form synergetic effects. For example, the profile thickness D decreases from the rotor blade root 102 toward the rotor blade outer edge 104. This is described in detail in FIGS. 3A to 3D. Furthermore, it is described in FIGS. 3A to 3D that the profile chords 110 increase in terms of their length. In order to realize a particularly low-friction transition from the rotor blade root 102 to the rotor blade outer edge 104, a ratio of the profile thickness D to the length of the profile chord 110 is configured to be virtually constant from the rotor blade root 102 to the rotor blade outer edge 104. As a result, for example, the suction force at the outer end is attenuated, as a result of which the configuration of pressure differences can be reduced. A further example for a synergetic effect is shown on the basis of the twist of the rotor blade 100. The twist runs continuously from the rotor blade root 102 toward the rotor blade outer edge 104, and is explained on the basis of the angles of incidence α between the profile chord 110 and the rotational plane in the corresponding section is A-A to D-D. In the end result, the rotor rim according to the invention is particularly efficient as what is known as a slow running turbine, since a tip speed ratio of up to 1.5 can also be realized. In addition, the sickle-shaped configuration in conjunction with a bulge of the rotor blade is particularly advantageous. A high angle of incidence α in the region of the rotor blade root 102 is achieved by way of the bulge and the sickle shape. This is particularly expedient for the self-contained starting function of the rotor blade. On account of the desired resistance wing function in the outer region of the rotor blade, the angle of incidence α is reduced in a manner which runs toward the outside, which is additionally aided by way of the sickle shape.

The invention claimed is:

1. A rotor blade (100) for a wind turbine, comprising:
   a rotor blade root (102),
   a rotor blade outer edge (104),
   a leading edge (106) and a trailing edge (108), the leading edge (106) and the trailing edge (108) defining a profile chord (110), the length of which is configured so as to increase from the rotor blade root (102) to the rotor blade outer edge (104),
   profile chord center points (112) defining a rotor wing center line (114) in a manner which runs from the rotor blade root (102) to the rotor blade outer edge (104), and the rotor wing center line (114) dividing the rotor blade outer edge (104) into a leading edge section (116) and a trailing edge section (118),
   characterized in that
   a winglet (120) which extends merely along the trailing edge section (118) is arranged on the rotor blade outer edge (104).

2. The rotor blade (100) as claimed in claim 1, characterized in that a spacing (A) between the trailing edge section (118) and a base (122) of the winglet (120) increases from the rotor wing center line (114) in the direction of the trailing edge (108).

3. The rotor blade (100) as claimed in claim 2, characterized in that the base (122) of the winglet (120) is of circular configuration in a rotor blade plane.

4. The rotor blade (100) as claimed in claim 1, characterized in that the circular base (122) of the winglet (120) is part of a rotation circle (202) of the rotor blade (100).

5. The rotor blade (100) as claimed in claim 1, characterized in that a profile thickness (D) decreases from the rotor blade root (102) to the rotor blade outer edge (104).

6. The rotor blade (100) as claimed in claim 5, characterized in that a ratio of the profile thickness (D) to the length of the profile chord (110) is of almost constant configuration from the rotor blade root (102) to the rotor blade outer edge (104).

7. The rotor blade (100) as claimed in claim 1, characterized in that the rotor blade (100) has an angle of incidence (α) of at least 30° on the rotor blade root (102).

8. The rotor blade (100) as claimed in claim 1, characterized in that the rotor blade (100) has an angle of incidence (α) of at most 5° on the rotor blade outer edge (104).

9. The rotor blade (100) as claimed in claim 1, characterized in that an angle of incidence (α) on the rotor blade outer edge (104) is greater than zero at the leading edge (106) and is less than or equal to zero at the trailing edge (108).

10. The rotor blade (100) as claimed in claim 1, characterized in that the rotor blade (100) has a twist which is of continuous configuration from the rotor blade root (102) as far as the rotor blade outer edge (104).

11. The rotor blade (100) as claimed in claim 1, characterized in that both the leading edge (106) and the trailing edge (108) are of sickle-shaped configuration.

12. The rotor blade (100) as claimed in claim 1, characterized in that the rotor wing center line (114) has a supplemental inclination in the rotational direction in relation to a wing longitudinal axis (124).

13. The rotor blade (100) as claimed in claim 12, characterized in that the supplemental inclination of the rotor wing center line (114) comprises a supplemental inclination angle (β) of between 1° and 10.

14. The rotor blade (100) as claimed in claim 1, characterized in that the rotor blade (100) has a curvature which is configured in the wing longitudinal axis (124).

15. A rotor rim (200) for a wind turbine, with a plurality of rotor blades (100) as claimed in claim 1.

16. The rotor rim (200) as claimed in claim 15, characterized in that the rotor rim (200) comprises at least 2 and at most 8 rotor blades (100).

17. The rotor rim (200) as claimed in claim 15, characterized in that the rotor rim (200) has a tip speed ratio of at most 7.

18. A wind turbine with a rotor blade (100) as claimed in claim 1.

19. The rotor blade (100) as claimed in claim 2, characterized in that the circular base (122) of the winglet (120) is part of a rotation circle (202) of the rotor blade (100).

20. The rotor blade (100) as claimed in claim 3, characterized in that the circular base (122) of the winglet (120) is part of a rotation circle (202) of the rotor blade (100).

* * * * *